(12) United States Patent
Kuehnle et al.

(10) Patent No.: US 10,060,516 B2
(45) Date of Patent: Aug. 28, 2018

(54) CLUTCH

(71) Applicant: Schaeffler Technologies AG & Co. KG, Herzogenaurach (DE)

(72) Inventors: Michael Kuehnle, Buehl (DE); Thorsten Krause, Buehl (DE); Kai Schenck, Offenburg (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 57 days.

(21) Appl. No.: 15/209,091

(22) Filed: Jul. 13, 2016

(65) Prior Publication Data

US 2017/0016521 A1 Jan. 19, 2017

(30) Foreign Application Priority Data

Jul. 13, 2015 (DE) .................. 10 2015 213 079

(51) Int. Cl.
*F16D 13/76* (2006.01)
*F16D 25/0635* (2006.01)
*F16H 45/02* (2006.01)

(52) U.S. Cl.
CPC ............ *F16H 45/02* (2013.01); *F16D 13/76* (2013.01); *F16D 25/0635* (2013.01); *F16D 2300/0214* (2013.01); *F16H 2045/0215* (2013.01); *F16H 2045/0221* (2013.01); *F16H 2045/0284* (2013.01); *F16H 2045/0294* (2013.01)

(58) Field of Classification Search
None
See application file for complete search history.

(56) References Cited

U.S. PATENT DOCUMENTS

| | | | | |
|---|---|---|---|---|
| 5,732,804 A | * | 3/1998 | Wienholt | F16H 45/02 192/113.3 |
| 5,743,365 A | * | 4/1998 | Makino | F16H 45/02 192/212 |
| 6,712,186 B1 | * | 3/2004 | Arhab | F16H 45/02 192/3.29 |
| 7,073,646 B2 | * | 7/2006 | Sasse | F16F 15/12366 192/213.1 |

* cited by examiner

Primary Examiner — Mark Alan Manley
(74) Attorney, Agent, or Firm — Brooks Kushman P.C.

(57) ABSTRACT

An oil-flooded single-plate or multi-plate lockup clutch is provided in a torque transfer device. The torque transfer device may, for example, be a converter, a dual clutch, a starting clutch, a manual shifter, or power shifting clutch, having a piston to engage the clutch and a damper. In accordance with the present disclosure, the piston together with a housing of the torque transfer device forms a closed pressure chamber when the clutch is engaged and at least one oil flow opening is provided in the piston in an area outside of the pressure chamber. The torque transfer device preferably has a damper and the piston of the clutch forms a part of the damper and may be designed as a retainer for springs of the damper.

15 Claims, 3 Drawing Sheets

CLUTCH

CROSS-REFERENCE TO RELATED APPLICATIONS

This application claims priority from German Patent Application No. 10 2015 213 079.7, filed Jul. 13, 2015, which application is incorporated herein by reference in its entirety.

FIELD

The present disclosure relates to an oil-flooded single-plate or multi-plate clutch in a torque transfer device such as a converter, a dual clutch, a starting clutch, a manual shifter, or power shifting clutch, having a piston to engage the clutch and a damper, wherein the piston of the clutch is at the same time also designed as part of the damper, and where the piston, together with a housing of the torque transfer device, forms a closed pressure chamber when the clutch is engaged.

BACKGROUND

A clutch is a mechanical device that engages and disengages the power transmission, especially from the driving shaft to the driven shaft. Clutches are used whenever the transmission of power or motion must be controlled either in amount or over time. Clutches control transmission of engine power to the wheels. In an oil-flooded single-plate or multi-plate clutch in a torque transfer device such as a converter, a dual clutch, a starting clutch, a manual shifter, or power shifting clutch, having a piston to engage the clutch and a damper, the piston of the clutch may, at the same time, also be designed as part of the damper, and where the piston, together with a housing of the torque transfer device, forms a closed pressure chamber when the clutch is engaged. Single-plate clutches of this type are used in some converter constructions so as to use the piston of the torque converter lockup clutch simultaneously in particular as a retainer damper to save a lot of space.

Unfortunately, during an engagement of the lockup clutch of this type, a slippage occurs between the piston and the housing, because of the differences in speed of rotation existing at this time, which are not reduced until operation is free of slip. These rotational speed differences result in hydraulic fluid pressures. This causes flows to develop in the converter to equalize the pressure. To this end, in single-plate clutches having a piston designed as a retainer bowl, the flow must stream around the retainer bowl. Avoidance of this pressure difference or compensatory flow is possible only with difficulty.

It therefore is an object of the present disclosure to provide an oil-flooded single-plate or multi-plate clutch of the above type having improved adjustability and to avoid the problems of differences in hydraulic fluid pressure. This object is fulfilled according to the disclosure by an oil-flooded single-plate or multi-plate clutch having the features above and below described. These and other objects, features, and advantages of the present disclosure will become readily apparent upon a review of the following detailed description of the disclosure, in view of the drawings and appended claims.

SUMMARY

In accordance with the disclosure, an oil-flooded single-plate or multi-plate lockup clutch is provided in a torque transfer device. The torque transfer device may, for example, be a converter, a dual clutch, a starting clutch, a manual shifter, or power shifting clutch, having a piston to engage the clutch and a damper. In accordance with the present disclosure, the piston together with a housing of the torque transfer device forms a closed pressure chamber when the clutch is engaged and at least one oil flow opening is provided in the piston in an area outside of the pressure chamber. The torque transfer device preferably has a damper and the piston of the clutch forms a part of the damper and may be designed as a retainer for springs of the damper.

The oil-flooded single-plate or multi-plate clutch may be provided with a friction lining which is positioned on a motor-side lateral surface of the piston and is provided to rest against an opposite inner surface of the housing when the piston is displaced axially, in order to engage the lockup clutch, and the oil flow opening is provided outside of the friction lining. Further, the piston may extend radially beyond the pressure chamber and the oil flow opening may be present radially outside of the pressure chamber. The oil flow opening may be in the form of a drilled hole. The one or more oil flow openings thus permit pressure equalization between a first and a second axial side of the piston. The present invention is usable in particular for oil-flooded single-plate clutches having a piston, in particular with a combined retainer piston in 2-channel torque converters.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, and/or pneumatics.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Figure 1:
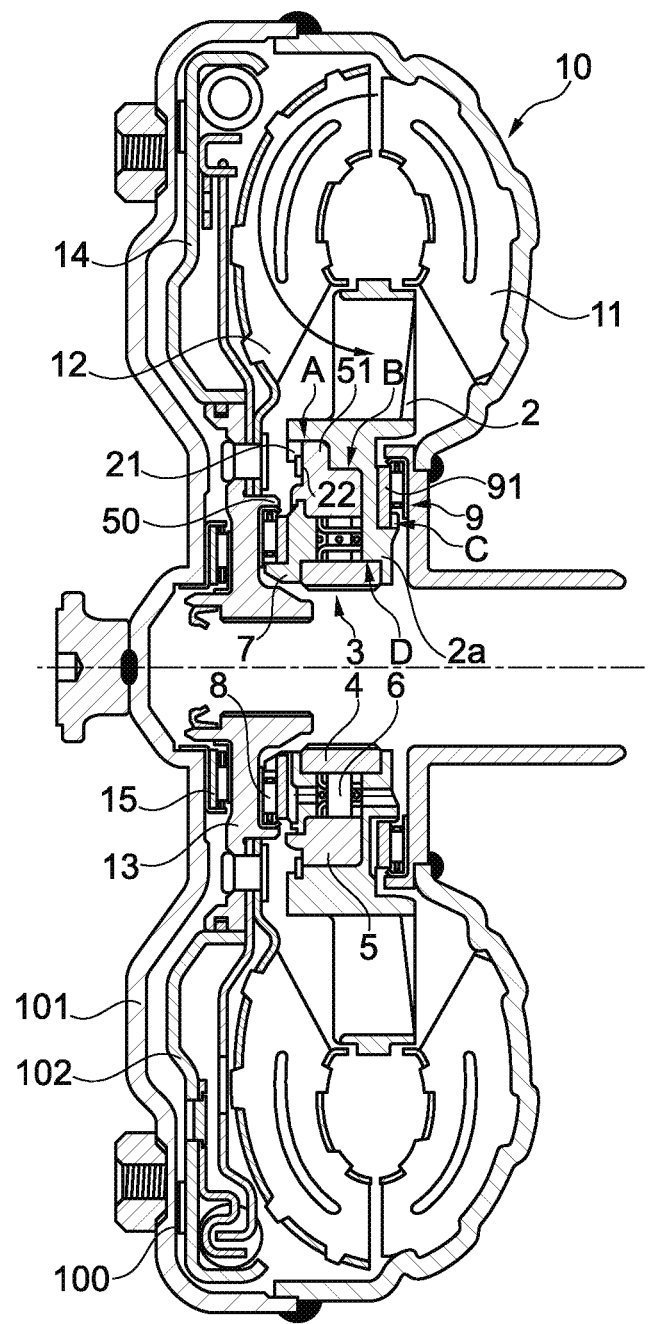
FIG. 1 shows a cross-sectional view of a two-channel torque converter having an oil-flooded single-plate clutch with a combined retainer piston.

As depicted in the cross-sectional view according to FIG. 1, in this embodiment a torque converter that serves as a hydraulic transmission unit comprises impeller 11 that is attached to housing 10, turbine rotor 12 that faces impeller 11 and is positioned rotatably in housing 10, stator 2 that is positioned between impeller 11 and turbine rotor 12, and freewheeling clutch 3. Freewheeling clutch 3 is positioned radially in stator 2 and has inner raceway 4, outer raceway 5 and sprag 6 positioned between them. Stator 2 and outer raceway 5 of freewheeling clutch 3 are fixed against rotary motion and are positioned concentrically with each other.

In the present case, stator 2 and outer raceway 5 are engaged through spline profile section A and centering section B, which are offset from each other axially and radially. As depicted in FIG. 1, spline profile section A has inner spline profile 21 and an outer spline profile 51.

Freewheeling clutch 3 is provided with front ring plate 7 and rear ring plate 2a, so that outer raceway 5 is centered in relation to inner raceway 4. The axial positioning of sprag 6 by means of a cage is likewise fixed. In this embodiment, stator 2 has an elongated section which extends radially inward from centering section B, and this elongated section functions as rear ring plate 2a for positioning freewheeling clutch 3. That is, stator 2 is formed in a single piece with rear ring plate 2a of freewheeling clutch 3. As a result, stator 2 is centered in relation to inner raceway 4 through engagement between a stepped internal circumferential surface of rear ring plate 2a, which is formed in a single piece with it and the external circumferential surface of inner raceway 4.

Front ring plate 7, which is conventionally designed as a separate element, is centered in relation to inner raceway 4 through engagement of its stepped internal circumferential surface with the external circumferential surface and front edge of inner raceway 4. The stepped external circumferential surface of front ring plate 7 is positioned on the internal circumferential surface of outer raceway 5, and is axially positioned and fastened in relation to outer raceway 5 by splining 50. Splining 50 is located in a position that overlaps the position of snap ring 22 radially. As a result, although the front side of stator 2 is centered in relation to inner raceway 4 in the conventional way by means of outer raceway 5 and front ring plate 7, its back side is centered in relation to inner raceway 4 directly in a single stage by means of rear ring plate 2a, which is designed in a single piece with stator 2.

Stator 2, outer raceway 5, front ring plate 7, and inner raceway 4, which are centered and axially positioned as described above, are supported in housing 10 by means of a pair of thrust bearings, i.e., front thrust bearing 8 and rear thrust bearing 9. Rear thrust bearing 9 is positioned axially opposite outer raceway 5, namely on the other side of rear ring plate 2a, which is formed in a single piece with stator 2. Spline profile C is formed on the inner circumference of raceway 91 of bearing 9 to prevent relative rotary motion between bearing raceway 91 and rear ring plate 2a, and is positioned radially inside bearing 9 and axially behind sprag 6.

Front thrust bearing 8 is positioned between front ring plate 7 and turbine rotor 12. Hub 13, which also serves as the hub of lockup clutch 14, is supported in housing 10 by means of thrust bearing 15.

Since a fluid flows in the direction of the arrow in FIG. 1, as described above, when there is a large difference in the rotary motion between impeller 11 and turbine rotor 12 (especially if turbine rotor 12 is braked because of excessive vehicle loading or the like), in the region of the converter an axial force acting from front to rear is exerted on stator 2 of the torque converter, which load is transferred via stator 2 to rear ring plate 2a and is finally received and absorbed by bearing 9. Since, in this embodiment, the bending force that acts on rear ring plate 2a and results from the axial load is transferred directly to bearing 9, rear ring plate 2a is thereby protected against deformation.

Also shown in FIG. 1 is friction lining 100, which is positioned on the motor-side lateral surface of the combined piston retainer and is provided to rest against the opposite inner surface of housing 101 when piston 14 is displaced axially, in order to engage the lockup clutch. So as to enable a certain flow of cooling oil even when the converter lockup clutch is engaged, orifice plate 102 is provided in piston 14, by which a certain exchange of oil between the opposite sides of piston 14 is enabled.

Figure 2:
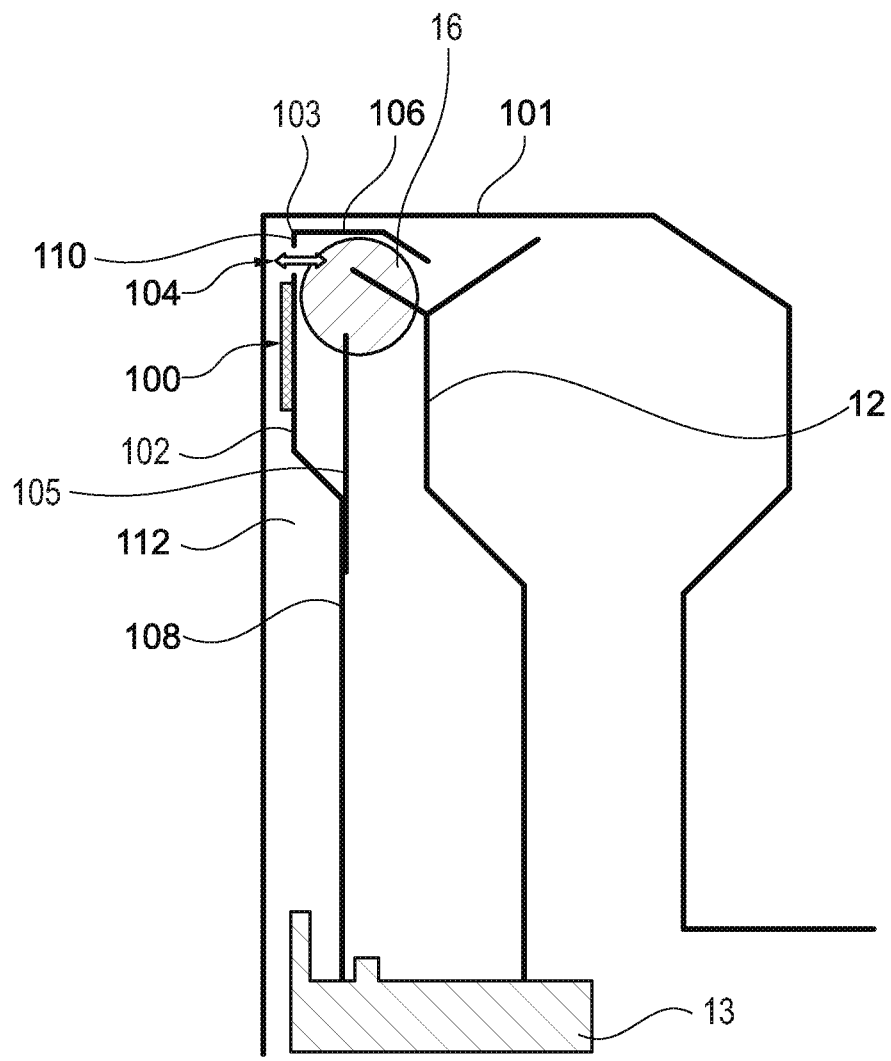
FIG. 2 is a schematic depiction of a two-channel converter having a retainer piston and oil flow openings, in accordance with the disclosure, in the combined retainer piston; and, FIG. 3 is a top view of a retainer piston having oil flow openings.

During an engagement of the lockup clutch, a slippage occurs between the piston and the housing. Because of the differences in speed of rotation existing at this time, which are not reduced until operation is free of slip, these rotational speed differences result in hydraulic fluid pressures. This causes flows to develop in the converter to equalize the pressure. To this end, in single-plate clutches having a piston designed as a retainer bowl, the flow must stream around the retainer bowl. To avoid this compensatory flow, which is possible only with difficulty, openings 104 in the schematic depiction shown in FIG. 2 are made in retainer piston 108 radially outside of friction lining 100 and radially inside of the rounding of retainer 106, or bend 103, which serve as oil flow openings for free oil circulation; that is, the oil does not have to run around the edge of the retainer. Oil openings 104 are preferably located in immediate proximity to friction lining 100. As a rule, certainly, the larger openings 104 and the more (elongated) holes, slits, etc. are provided, the greater the benefit. But, at the same time, the available space requirement and the necessary rigidity of retainer piston 108 must be taken into account, so that an optimization is achieved between oil flow cross section and space requirement/rigidity.

If retainer piston 108 with the bowl-shaped retainer 106 is designed with oil flow openings 104 provided outside of the friction linings, improved adjustability of the clutch results, especially if the pressure equalization holes or oil openings 104 are made in radial section 110 of retainer piston 108 located radially outside of pressure chamber 112, and particularly immediately outside of friction lining 100 (since the retainer pistons must be pressure-tight, it is possible to position the holes/openings only radially outside of the friction lining). Through these holes/openings 104 the oil can drain away (preferably radially) directly at the back of the piston, and does not have to first flow a long way around the retainer edge and springs. This is of decisive benefit to the sequence in the transition from clutch disengaged to clutch engaged, when even very small oil gaps and flow paths are relevant. Retainer 106 is arranged radially outward of damper 16, for example, as a bowl-shaped retainer plate. In an example embodiment, plate 105 is connected to retainer piston 108, specifically orifice plate 102, and extends radially outward to connect with damper 16. As shown in FIG. 2, plate 105 extends into damper 16.

Figure 3:
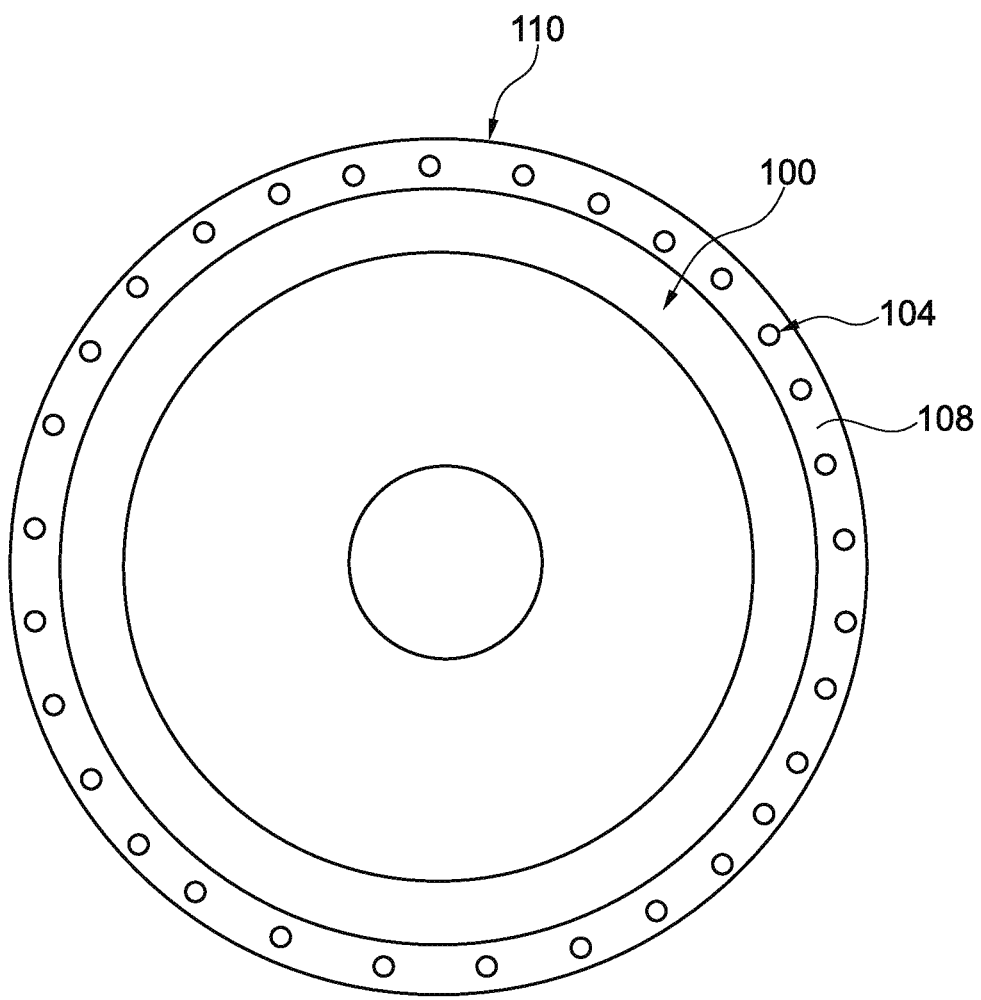

FIG. 3 shows a top view of retainer piston 108 having a large number of such oil flow openings 104 located in radial section 110 and radially outside of friction lining 100 (for example, 50 holes with a diameter of 3 mm), shown in top view.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

2 Stator
2a Rear Ring Plate
3 Clutch
4 Inner Raceway
5 Outer Raceway
6 Sprag
7 Front Ring Plate
8 Front Thrust Bearing
9 Rear Thrust Bearing
10 Housing
11 Impeller
12 Turbine Rotor
13 Hub
14 Piston
15 Thrust Bearing
16 Damper
21 Inner Spline Profile
22 Snap Ring
50 Splining
51 Outer Spline Profile
91 Raceway
100 Friction Lining
101 Housing
102 Orifice Plate
103 Bend
104 Openings
106 Retainer
108 Retainer Piston
110 Radial Section
112 Pressure Chamber
A Spline Profile Section
B Centering Section
C Spline Profile

What is claimed is:

1. An oil-flooded single-plate or multi-plate clutch in a torque transfer device, comprising:
a housing
a damper; and,
a piston, including:
a first plate having a friction lining and one or more openings;
a second plate connected to the first plate at a bend, the one or more openings arranged radially between the friction lining and the bend; and a third plate connected to the first plate, arranged radially inward from the second plate, and forming part of the damper, wherein the third plate extends radially outward from the first plate for connection with the damper;
wherein the piston together with the housing forms a closed pressure chamber when the clutch is engaged and the openings are provided in the piston in an area outside of the pressure chamber.

2. The oil-flooded single-plate or multi plate clutch of claim 1, wherein the torque transfer device is a converter, a dual clutch, a starting clutch, a manual shifter, or power shifting clutch.

3. The oil-flooded single-plate or multi-plate clutch according to claim 1, wherein the piston is a part of the damper.

4. The oil-flooded single-plate or multi-plate clutch according to claim 3, wherein the piston is designed as a retainer for springs of the damper.

5. The oil-flooded single-plate or multi-plate clutch according to claim 1, wherein the friction lining is arranged on a motor-side lateral surface of the piston and rests against an opposite inner surface of the housing when the piston is displaced axially, in order to engage the clutch.

6. The oil-flooded single-plate or multi-plate clutch according to claim 3, wherein the friction lining is arranged on a motor-side lateral surface of the piston and rests against an opposite inner surface of the housing when the piston is displaced axially in order to engage the clutch.

7. The oil-flooded single-plate or multi-plate clutch according to claim 1, wherein the piston extends radially outward of the pressure chamber.

8. The oil-flooded single-plate or multi-plate clutch according to claim 5, wherein the piston extends radially outward of the pressure chamber.

9. The oil-flooded single-plate or multi-plate clutch according to claim 1, wherein each of the one or more openings is a drilled hole.

10. The oil-flooded single-plate or multi-plate clutch according to claim 8, wherein each of the one or more openings is a drilled hole.

11. The oil-flooded single-plate or multi-plate clutch according to claim 1, wherein the one or more openings equalizes pressure between a first axial side and a second axial side of the piston.

12. The oil-flooded single-plate or multi-plate clutch according to claim 5, wherein the one or more openings equalizes pressure between a first axial side and a second axial side of the piston.

13. The oil-flooded single-plate or multi-plate clutch according to claim 8, wherein the one or more openings equalizes pressure between a first axial side and a second axial side of the piston.

14. The oil-flooded single-plate or multi-plate clutch according to claim 1, wherein the second plate is arranged as a radially outer retainer.

15. The oil-flooded single-plate or multi-plate clutch according to claim 1, wherein the one or more openings are, at least partially, radially aligned with the damper.

* * * * *